(12) United States Patent
Tagami

(10) Patent No.: US 9,654,748 B2
(45) Date of Patent: May 16, 2017

(54) PROJECTION DEVICE, AND PROJECTION METHOD

(71) Applicant: Panasonic Intellectual Property Management Co., Ltd., Osaka (JP)

(72) Inventor: Tomohisa Tagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/974,243

(22) Filed: Dec. 18, 2015

(65) Prior Publication Data

US 2016/0191873 A1 Jun. 30, 2016

(30) Foreign Application Priority Data

Dec. 25, 2014 (JP) .................................. 2014-263639
Dec. 7, 2015 (JP) .................................. 2015-238161

(51) Int. Cl.
*H04N 9/31* (2006.01)
*H04N 5/64* (2006.01)
*G01B 11/25* (2006.01)

(52) U.S. Cl.
CPC ....... *H04N 9/3155* (2013.01); *G01B 11/2509* (2013.01); *G01B 11/2536* (2013.01); *H04N 9/3111* (2013.01); *H04N 9/3185* (2013.01); *H04N 9/3194* (2013.01)

(58) Field of Classification Search
CPC ...... H04N 17/00; H04N 17/02; H04N 9/3158; H04N 9/3155

USPC .......................................... 348/744, 745, 760
See application file for complete search history.

(56) References Cited

U.S. PATENT DOCUMENTS

| 6,554,431 | B1 | 4/2003 | Binsted et al. |
| 8,766,952 | B2 * | 7/2014 | Lee ....................... G06F 3/0425 345/175 |
| 8,794,768 | B2 * | 8/2014 | Ozawa ................. G03B 21/006 345/158 |
| 2005/0280831 | A1 | 12/2005 | Fujiwara et al. |
| 2009/0115721 | A1 | 5/2009 | Aull et al. |
| 2010/0245683 | A1 * | 9/2010 | Rancuret ................ H04N 9/312 348/744 |

FOREIGN PATENT DOCUMENTS

| JP | 2006-3212 | 1/2006 |
| JP | 2007-309660 | 11/2007 |
| JP | 4917351 | 4/2012 |

(Continued)

*Primary Examiner* — Trang U Tran
(74) *Attorney, Agent, or Firm* — Wenderoth, Lind & Ponack, L.L.P.

(57) ABSTRACT

A projection device of the present disclosure includes a projection unit for radiating on a projection target object in a time-divided manner, in one frame period of a video, a visible light image that is based on a video signal and an invisible light image for acquiring predetermined information, and a controller for controlling an order of a radiation period for the visible light image and a radiation period for the invisible light image in the one frame period. The controller includes, as a radiation mode, a first mode for radiating the invisible light image in a manner of distributing the invisible light image over a plurality of periods within the one frame period.

14 Claims, 7 Drawing Sheets

(56) References Cited

FOREIGN PATENT DOCUMENTS

| | | |
|---|---|---|
| JP | 2012-255883 | 12/2012 |
| JP | 2013-80296 | 5/2013 |
| JP | 2013-195798 | 9/2013 |
| JP | 2014-188322 | 10/2014 |

* cited by examiner 7 6 5 4 3 2 1 0
1 1 1 1 0 0 0 0 = Pattern 1 (MSB)
1 1 0 0 1 1 0 0 = Pattern 2

Pattern 1

Pattern 2

Pattern 3

7 6 5 4 3 2 1 0
Space code value
(address)

Correctly grasped as address (100)

Erroneously grasped as address (110)

PROJECTION DEVICE, AND PROJECTION METHOD

BACKGROUND

1. Technical Field

The present disclosure relates to a projection device and a projection method which are capable of radiating invisible light in addition to visible light for forming a projection image.

2. Description of the Related Art

Unexamined Japanese Patent Publication No. 2012-255883 discloses a video projection system for performing projection mapping on a target object while measuring the three-dimensional shape of the target object by projecting invisible light. The video projection system includes a visible light projection unit for projecting a visible light video, and an invisible light projection unit for projecting an invisible light video, and the invisible light video is projected being superimposed on the visible light video.

Also, Japanese Patent No. 4,917,351 presents a space coding method for projecting a binary projection pattern by a projector, and for generating a code value that is absolute with respect to space. According to the space coding method, a number of shot images necessary for measuring the shape may be reduced, and speed of measurement may be increased.

SUMMARY

According to one aspect of the present disclosure, there is provided a projection device including a projection unit for radiating on a projection target object in a time-divided manner, in one frame period of a video, a visible light image that is based on a video signal and an invisible light image for acquiring predetermined information, and a controller for controlling an order of a radiation period for the visible light image and a radiation period for the invisible light image in the one frame period. The controller includes, as a radiation mode, a first mode for radiating the invisible light image in a manner of distributing the invisible light image over a plurality of periods within the one frame period.

DETAILED DESCRIPTION

Hereinafter, exemplary embodiments will be described in detail with reference to the drawings as appropriate. However, unnecessarily detailed description may be omitted. For example, detailed description of already well-known matters and repeated description of substantially the same configuration may be omitted. All of such omissions are intended to facilitate understanding by those skilled in the art by preventing the following description from becoming unnecessarily redundant.

Moreover, the inventor(s) provide(s) the appended drawings and the following description for those skilled in the art to fully understand the present disclosure, and do(es) not intend the subject described in the claims to be limited by the appended drawings and the following description.

First Exemplary Embodiment

Hereinafter, a configuration and operation of a projection device will be described in detail with reference to the appended drawings as a first exemplary embodiment.

(1-1. Configuration)

Figure 1:
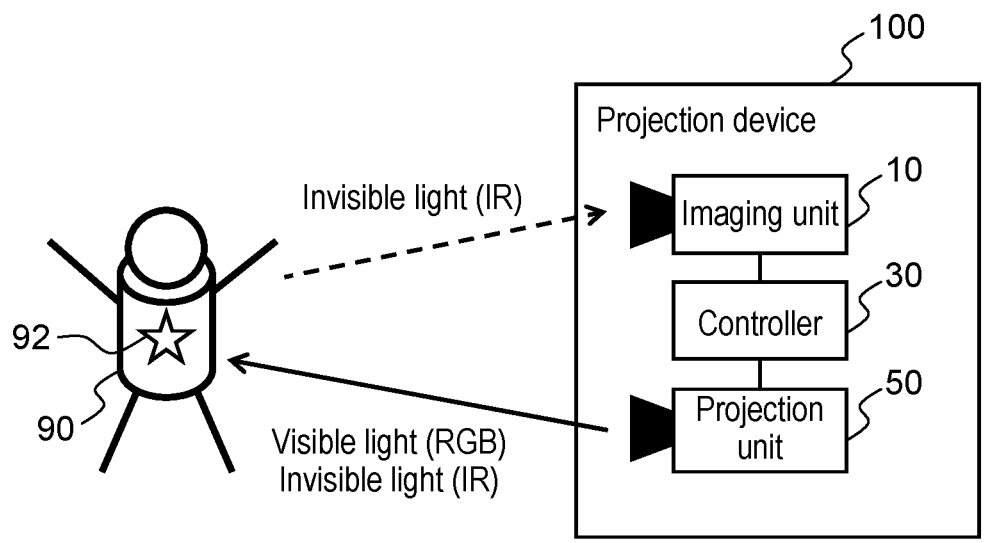
FIG. 1 is a diagram showing a schematic configuration of a projection device.

FIG. 1 is a diagram showing a schematic configuration of the projection device.

Projection device 100 of the present exemplary embodiment is capable of projecting, on projection target object 90, image 92 in visible light (for example, red light, blue light, and green light) based on a video signal. Projection device 100 is also capable of projecting an image in invisible light in order to measure predetermined information (three-dimensional shape, distance, etc.) of projection target object 90. Projection device 100 images an invisible light image projected on projection target object 90, and generates a measurement image based on the imaged image. Projection device 100 grasps predetermined information (three-dimensional shape, distance, etc.) of projection target object 90 from the measurement image, and performs various types of control such as autofocus control based on the grasped predetermined information. As measurement light to be emitted to projection target object 90 for generation of the measurement image, invisible light (for example, infrared light whose peak wavelength is between 800 nm to 900 nm inclusive) is used so as not to be visually perceived by a viewer of projected image 92.

Projection device 100 includes imaging unit 10 for shooting the invisible light image, controller 30 for controlling an operation of entire projection device 100, and projection unit 50 for projecting an image in visible light or invisible light on projection target object 90.

Figure 2:
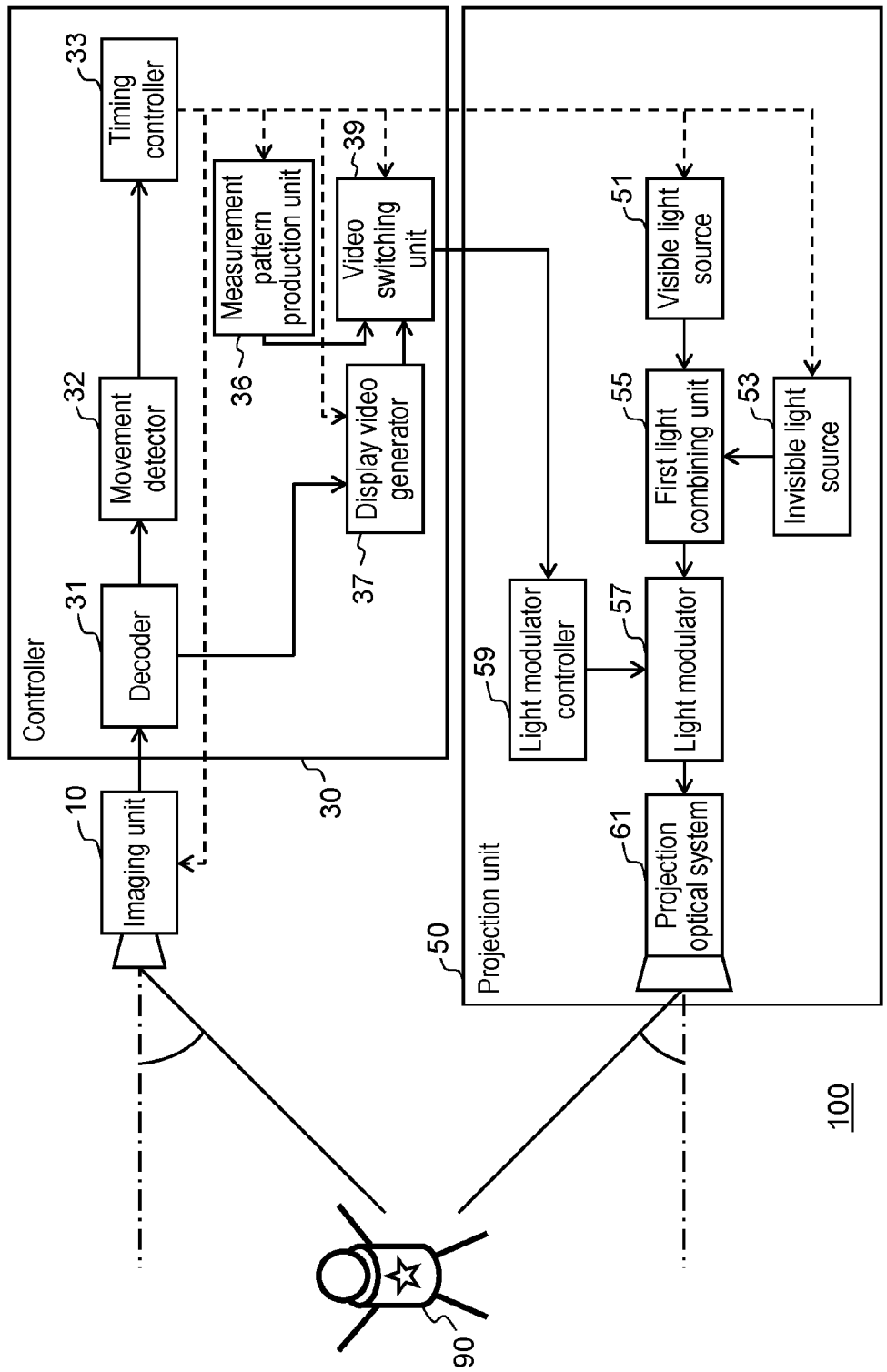
FIG. 2 is a block diagram showing a detailed configuration of the projection device.

FIG. 2 is a block diagram showing a more specific configuration of projection device 100. Controller 30 includes decoder 31, movement detector 32, timing controller 33, measurement pattern production unit 35, display video generator 37, and video switching unit 39. Controller 30 controls image processing for an input video signal, driving of an optical system, operation of a light source, and the like. Controller 30 may be configured only by hardware (semiconductor integrated circuit), or may be realized by a combination of hardware and software (program). For example, controller 30 may be configured by one or a plurality of semiconductor integrated circuits called a CPU, an MPU, and the like.

Projection unit 50 includes visible light source 51, invisible light source 53, first light combining unit 55, light modulator 57, light modulator controller 59, and projection optical system 61.

Imaging unit 10 images, in units of coded pattern images, invisible light images projected on projection target object 90 by projection unit 50, and outputs the measurement images.

Decoder 31 calculates (decodes) a three-dimensional shape of projection target object 90 and a distance to projection target object 90 according to a coded pattern projection method and based on the measurement images in a plurality of patterns from imaging unit 10 and a positional relationship between imaging unit 10 and projection unit 50, and generates a distance image. The function of decoder 31 may be implemented in imaging unit 10.

Movement detector 32 calculates a difference in the three-dimensional shape from the distance images of a plurality of consecutive frames (for example, preceding two frames) output from decoder 31, and thereby detects the movement of projection target object 90.

Display video generator 37 generates and outputs a video signal for projection based on an input video signal and according to the three-dimensional shape measurement result from decoder 31. Additionally, display video generator 37 does not output a video during an initialization process at the time of activation of projection device 100.

Measurement pattern production unit 35 produces a measurement light pattern (details will be given later) for the coded pattern projection method, according to a control signal from timing controller 33.

Video switching unit 39 selects and outputs, according to a control signal from timing controller 33, one of an output from measurement pattern production unit 35 and an output from display video generator 37.

Timing controller 33 controls imaging unit 10, measurement pattern production unit 35, invisible light source 53, and video switching unit 39 so that a projection image is imaged in synchronization with a measurement pattern. Also, timing controller 33 controls display video generator 37, visible light source 51, and video switching unit 39, and generates a visible light image. Furthermore, timing controller 33 controls measurement pattern production unit 35, display video generator 37, and video switching unit 39 based on a detection result from movement detector 32, and sets a radiation mode of light modulator 57 to a concentrated mode or a distributed mode.

At projection unit 50, light modulator 57 modulates light from first light combining unit 55 according to a control signal from light modulator controller 59. Light modulator 57 is configured by a DMD (Digital Mirror Device). Light modulator controller 59 controls light modulator 57 according to an output signal from video switching unit 39.

Visible light source 51 emits visible light (in the present exemplary embodiment, red (R) light, green (G) light, and blue (B) light) according to a control signal from timing controller 33. Invisible light source 53 emits invisible light (in the present exemplary embodiment, infrared light) according to a control signal from timing controller 33.

First light combining unit 55 combines the visible light from visible light source 51 and the invisible light from invisible light source 53 on the same optical axis, and outputs the light to light modulator 57. First light combining unit 55 is configured by a dichroic mirror, for example.

Projection optical system 61 projects an image modulated by light modulator 57 on projection target object 90.

Figure 3:
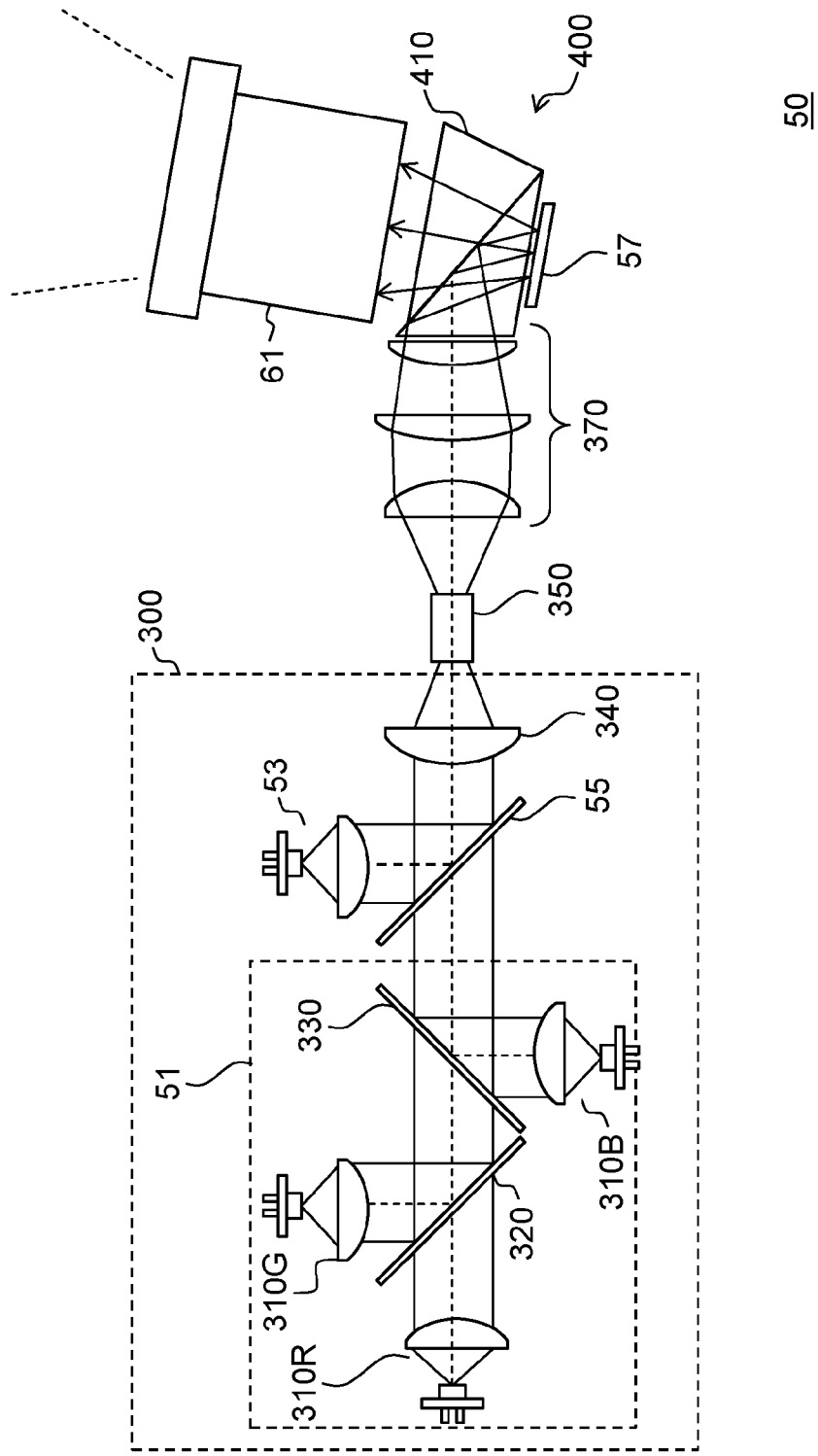
FIG. 3 is a block diagram showing an optical configuration of a projection unit.

FIG. 3 is a diagram describing an optical configuration of projection unit 50. Projection unit 50 includes, as optical parts, visible light source 51, invisible light source 53, first light combining unit 55, first optical system 340, rod integrator 350, second optical system 370, light modulator 57, video generator 400, and projection optical system 61.

Video generator 400 supplies a generated video to projection optical system 61. Projection optical system 61 performs optical transformation such as focusing or zooming on the video supplied by video generator 400, and projects the video on the projection target object.

Visible light source 51 includes red light source 310R, green light source 310G, blue light source 310B, second light combining unit 320, and third light combining unit 330. Second light combining unit 320 transmits only light with a wavelength longer than about 610 nm, and reflects light with shorter wavelengths. Third light combining unit 330 transmits only light with a wavelength longer than about 480 nm, and reflects light with shorter wavelengths. Second light combining unit 320 and third light combining unit 330 are each configured by a dichroic mirror having predetermined characteristics, for example.

Red light source 310R, green light source 310G, and blue light source 310B each emit light in synchronization with a predetermined control timing signal supplied by timing controller 33. Red light emitted by red light source 310R passes through second light combining unit 320, and is combined with green light emitted by green light source 310G and reflected by second light combining unit 320. This combined light passes through third light combining unit 330, and is combined with blue light emitted by blue light source 310B and reflected by third light combining unit 330. Light emitted from three types of light sources, which are red, green, and blue, is combined in the above manner as visible light.

First light combining unit 55 has a high transmittance for visible light with a wavelength shorter than 800 nm, and a high reflectance for infrared light with a long wavelength. First light combining unit 55 is configured by a dichroic mirror, for example. Invisible light source 53 is an infrared light source, for example. Infrared light emitted from invisible light source 53 is reflected by first light combining unit 55. On the other hand, visible light supplied by visible light source 51 passes through first light combining unit 55. The visible light and the invisible light are thereby combined and emitted from first light combining unit 55.

The visible light and the invisible light combined by first light combining unit 55 enters video generator 400 via first optical system 340, rod integrator 350, and second optical system 370 in this order.

Video generator 400 generates a projection image according to an output signal of video switching unit 39. Video generator 400 includes light modulator 57. In the present exemplary embodiment, light modulator 57 is a DMD having a large number of micromirrors arranged on a plane. Light modulator 57 deflects each of the arranged micromirrors according to an input video signal, and spatially modulates entering light. Light source unit 300 controls each of red light source 310R, green light source 310G, blue light source 310B, and invisible light source 53, and emits red light, green light, blue light, and infrared light to video generator 400 in a time-divided manner. Light modulator 57 sequentially and repeatedly receives, via third optical system 410, blue light, green light, red light, and invisible light that are emitted in a time-divided manner. Light modulator 57 deflects each of the micromirrors in synchronization with the timing of emission of each type of light. Light modulator 57 deflects the micromirrors according to a video signal output from video switching unit 39 to generate light that proceeds to projection optical system 61 and light that proceeds to outside the effective coverage of projection optical system 61. Video generator 400 may thus generate a projection image according to a video signal, and supply the generated projection image to projection optical system 61.

Projection optical system 61 includes optical members such as a focus lens and zoom lens. Projection optical system 61 magnifies, and projects on a projection surface, a video specified by light entering from video generator 400. Controller 30 focuses the projection image by adjusting the position of the focus lens. Also, controller 30 controls the zoom factor (angle of view) by adjusting the position of the zoom lens. At this time, controller 30 focuses the projection image by adjusting the position of the focus lens based on predetermined zoom tracking data, in such a way as to follow the movement of the zoom lens.

Additionally, in the present exemplary embodiment, the configuration of a projection device according to a DLP (Digital-Light-Processing) method using a DMD for light modulator 57 is described as an example, but the configuration of the projector is not limited to the above. That is, the projection device may adopt a configuration according to a liquid crystal method.

(1-2. Operation)

An operation of projection device 100 configured in the above manner will be described below. Projection device 100 of the present exemplary embodiment measures predetermined information (three-dimensional shape, distance, etc.) of projection target object 90 by using the coded pattern projection method. In the following, the coded pattern projection method will be described.

(1-2-1. Coded Pattern Projection Method)

Figure 4A:
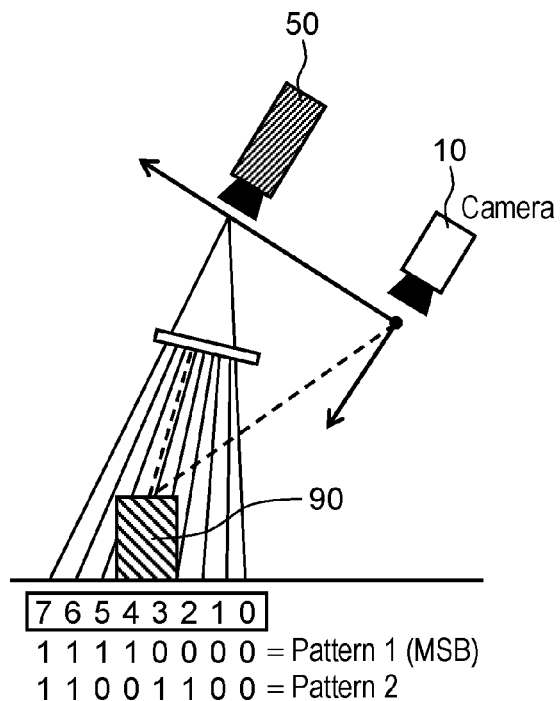
FIG. 4A is a diagram for describing a coded pattern projection method.

FIG. 4A is a diagram for describing the coded pattern projection method. The coded pattern projection method is a known technique for measuring the three-dimensional shape and the distance of projection target object 90. According to the coded pattern projection method, a set of measurement patterns including a plurality of measurement patterns is projected by projection unit 50 on a measurement target object. Measurement patterns projected on projection target object 90 are imaged by imaging unit 10 on a measurement pattern basis. Then, the three-dimensional shape or the distance of projection target object 90 is measured based on the imaged images obtained with respect to the plurality of measurement patterns.

Figure 4B:
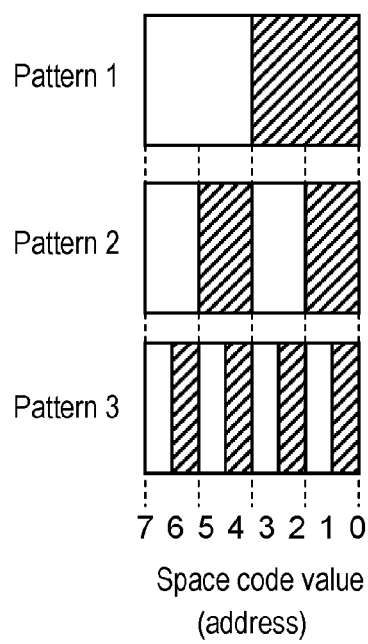
FIG. 4B is a diagram for describing a measurement pattern image.

In the present example, as shown in FIG. 4B, three measurement patterns having spatially different slit widths are used, but a number of measurement patterns is not limited to three. The number of measurement patterns is increased when higher resolution is necessary. In pattern 1, an image region is divided into two in the horizontal direction, and one region is assigned to a region where light is to be projected (white region in FIG. 4B), and the other region is assigned to a region where light is not to be projected (black region in FIG. 4B). In pattern 2, an image region is divided into four in the horizontal direction, and a region where light is to be projected and a region where light is not to be projected are assigned alternately to the divided regions. In pattern 3, an image region is divided into eight in the horizontal direction, and a region where light is to be projected and a region where light is not to be projected are assigned alternately to the divided regions.

Images in patterns 1 to 3 are projected on a measurement target portion in a time-divided manner, and an image of projection target object 90 is shot for each pattern. The value of a region where light is projected (white region) is given as "1" and the value of a region where light is not projected (black region) is given as "0", and a space code value (address) is calculated by adding the value of each region of shot images in patterns 1 to 3. The space code value takes a different value (0 to 7) according to the position of a region obtained by dividing the image region in the horizontal direction. In other words, by referring to the space code value (address) of a pixel in an imaged image, the position of the pixel in the horizontal direction may be grasped.

Also, by using an image in a pattern obtained by rotating, by 90 degrees (hereinafter referred to as a "vertical pattern"), the pattern of the image according to the measurement pattern shown in FIG. 4B (hereinafter referred to as a "horizontal pattern image"), the position of a pixel in the vertical direction may be grasped in the same manner. Accordingly, by using a set of horizontal pattern images and a set of vertical pattern images, the positions of each pixel in the vertical direction and the horizontal direction in the imaged image may be grasped. The three-dimensional shape and the distance for projection target object 90 may be grasped based on the position of the pixel grasped from the imaged image, the position where the pixel is supposed to be present, and the positional relationship between imaging unit 10 and projection unit 50.

Projection device 100 in the present exemplary embodiment projects, on projection target object 90, an image pattern according to the coded pattern projection method in invisible light, and generates a measurement image based on information acquired based on the reflected light. Then, predetermined information (three-dimensional shape, distance, etc.) of projection target object 90 are grasped from the measurement image, and various types of control are performed based on the grasped predetermined information.

As a frequently used example coded pattern, there is a pattern where the pattern widths for light emission and non-light emission are set to pixels of powers of two. For example, a case is considered where light modulator 57 is configured by 1,024 pixels in the horizontal direction. In this case, ten types of pattern widths, namely, 512 pixels, 256 pixels, 128 pixels, 64 pixels, 32 pixels, 16 pixels, 8 pixels, 4 pixels, 2 pixels, and 1 pixel from the widest, are used. By using these ten types of patterns, it becomes possible to perform measurement by a unit of pixel in light modulator 57.

(1-2-2. Light Emission Sequence Control)

Figure 5A:
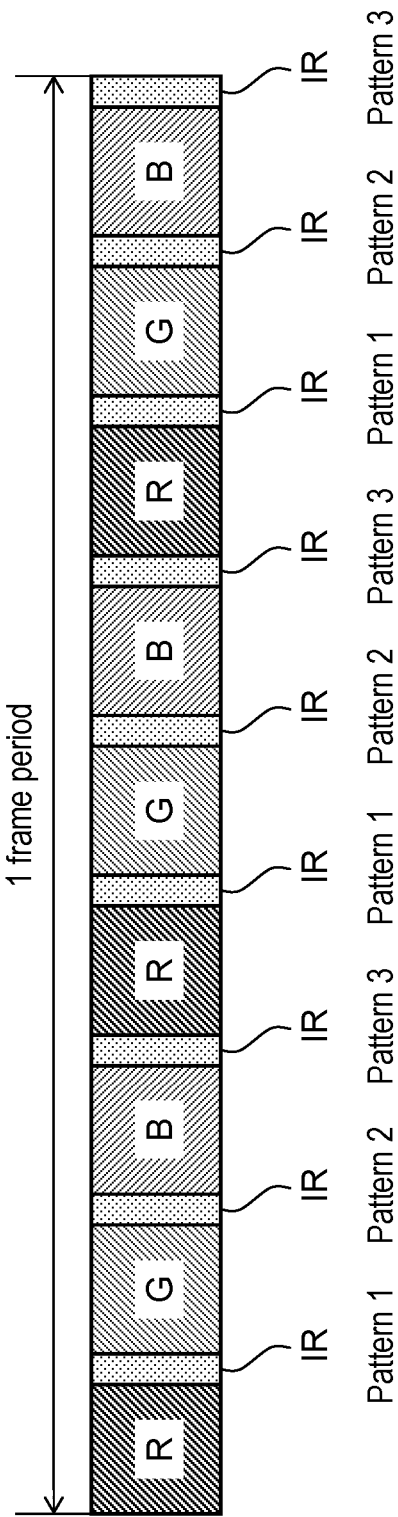
FIG. 5A is a diagram for describing a light emission sequence in a distributed mode of a projection device of a present exemplary embodiment.
Figure 5B:
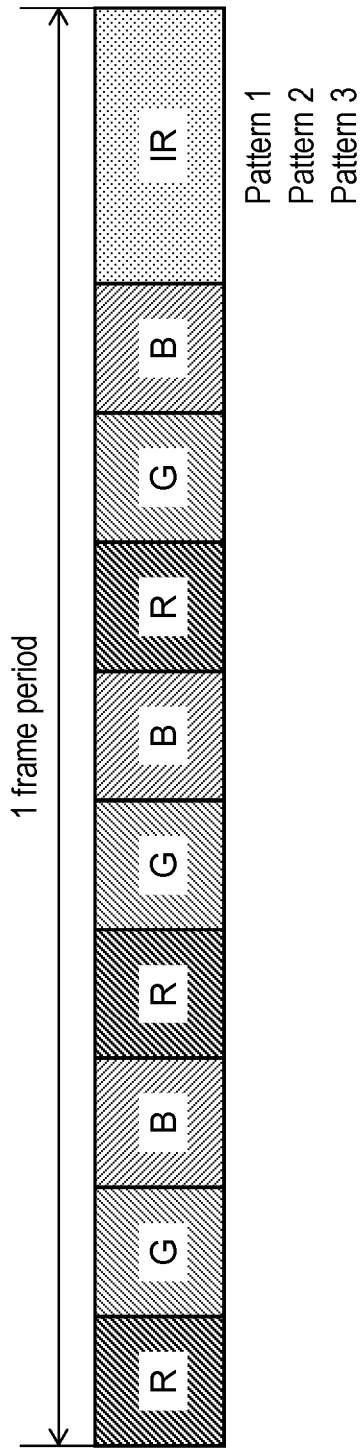
FIG. 5B is a diagram for describing a light emission sequence in a concentrated mode of the projection device of the present exemplary embodiment.

FIGS. 5A and 5B are diagrams describing light emission sequences of projection device 100 of the present exemplary embodiment. As the radiation mode of light modulator 57, projection device 100 includes a distributed mode and a concentrated mode.

As shown in FIG. 5A, in the distributed mode, periods when images in invisible light (IR: pattern 1, pattern 2, and pattern 3) output from invisible light source 53 are projected are provided between periods, in one frame period, when images (visible light images) each in red light (R), green light (G), or blue light (B) output from visible light source 51 are projected. That is, images in invisible light are projected being distributed over one frame period. In other words, periods when invisible light is radiated are disposed in a distributed manner in one frame period. In the distributed mode, one set of measurement patterns in one frame period is projected being distributed over a plurality of periods when invisible light is radiated.

As shown in FIG. 5B, in the concentrated mode, in one frame period, visible light images in red light (R), visible light images in green light (G), and visible light images in blue light (B) output from visible light source 51 are continuously projected, and then images in invisible light (IR: pattern 1, pattern 2, and pattern 3) output from invisible light source 53 are projected being concentrated in one period. That is, only one period is disposed in one frame period for radiation of invisible light. In the concentrated mode, all of one set of measurement patterns is projected within one period when invisible light images are to be projected, in one frame period.

Timing controller 33 of controller 30 sets the radiation mode to the distributed mode or the concentrated mode based on the movement of projection target object 90. That is, when the movement of projection target object 90 is relatively small, the radiation mode is set to the distributed mode, and when the movement of projection target object 90 is relatively large, the radiation mode is set to the concentrated mode. The reason for switching the radiation mode in this manner is given below.

Invisible light is not sensed by human eyes. Accordingly, if invisible light periods are provided collectively at one position in one frame period as shown in FIG. 5B, a flicker is sensed by a viewer of a projection image. Particularly, in a case where an amount of movement of a projection image is small, the flicker becomes more conspicuous. Additionally, in a case where the amount of movement of a projection image is large, the flicker does not particularly pose a problem.

On the other hand, as shown in FIG. 5A, if the invisible light periods are provided at a plurality of positions in one frame period in a distributed manner, when projection target object 90 moves in one frame period, there is a problem that measurement according to the coded pattern projection method cannot be performed accurately due to measurement being performed for projection target object 90 that is at different positions in the first half and the second half in the frame. This will be described with reference to FIGS. 6A and 6B.

Figure 6A:
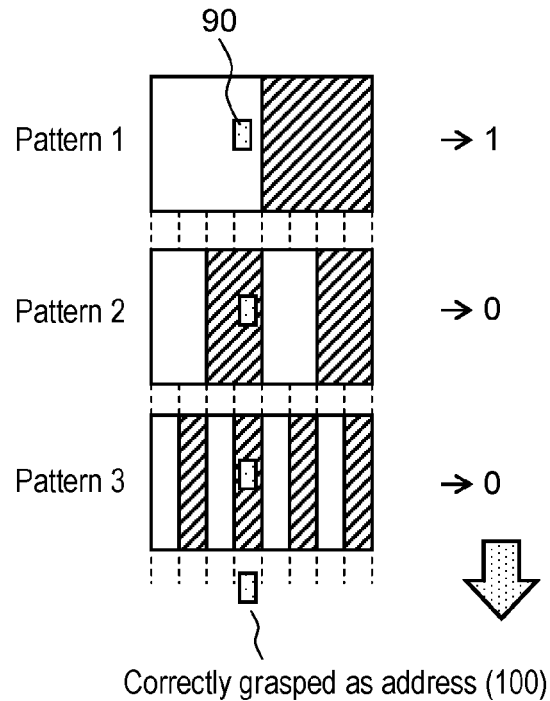
FIG. 6A is a diagram for describing address detection in the distributed mode.
Figure 6B:
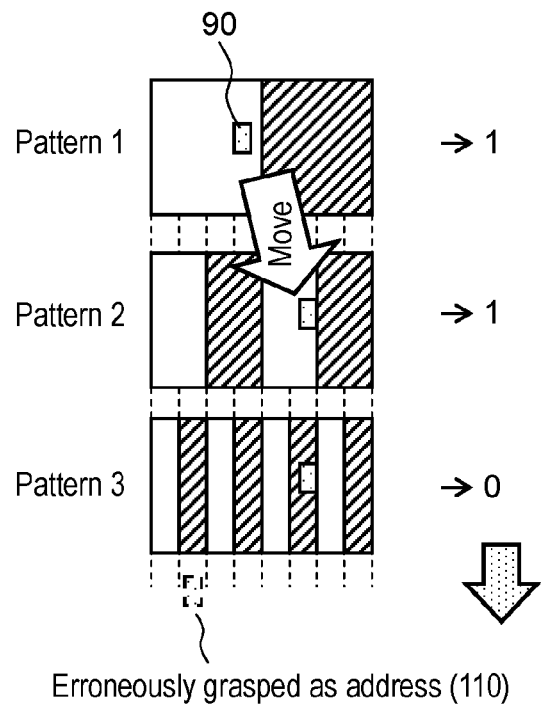
FIG. 6B is a diagram for describing a problem which may occur in the distributed mode.

As shown in FIG. 6A, when projection target object 90 does not move in one frame period, a code value is detected for each image pattern. Next, for example, a case where projection target object 90 moves in one frame period (between pattern 1 and pattern 2) from the position of address (100) to the position of address (010), as shown in FIG. 6B, will be considered. In this case, since the positions of projection target object 90 at the time of projection in the image patterns are different, the code values are detected at different positions for respective image patterns. In the example in FIG. 6B, address (110) different from position (100) before movement or position (010) after movement is measured.

Accordingly, with projection device 100 of the present exemplary embodiment, if there is a possibility of projection target object 90 moving in one frame period, that is, if the amount of movement is large, periods when invisible light (IR) is output from invisible light source 53 are collectively provided at one position in the concentrated mode in FIG. 5B. Timings when respective measurement patterns are projected on projection target object 90 thus come close to one another, and the shift in the positions of projection target object 90 at the time of projection of respective measurement patterns is reduced, and the error in the measurement is reduced.

In view of the above, when the amount of movement of projection target object 90 is relatively small, projection device 100 of the present exemplary embodiment sets the radiation mode to the distributed mode. Occurrence of flicker is thereby reduced. On the other hand, when the amount of movement of projection target object 90 is relatively large, the radiation mode is set to the concentrated mode. By collecting the periods when invisible light is radiated at one position, the projection timings of measurement patterns may be brought close to one another, and the shift in the position of projection target object 90 at the time of projection of the measurement patterns may be reduced, and the error in the measurement may be reduced.

Figure 7:
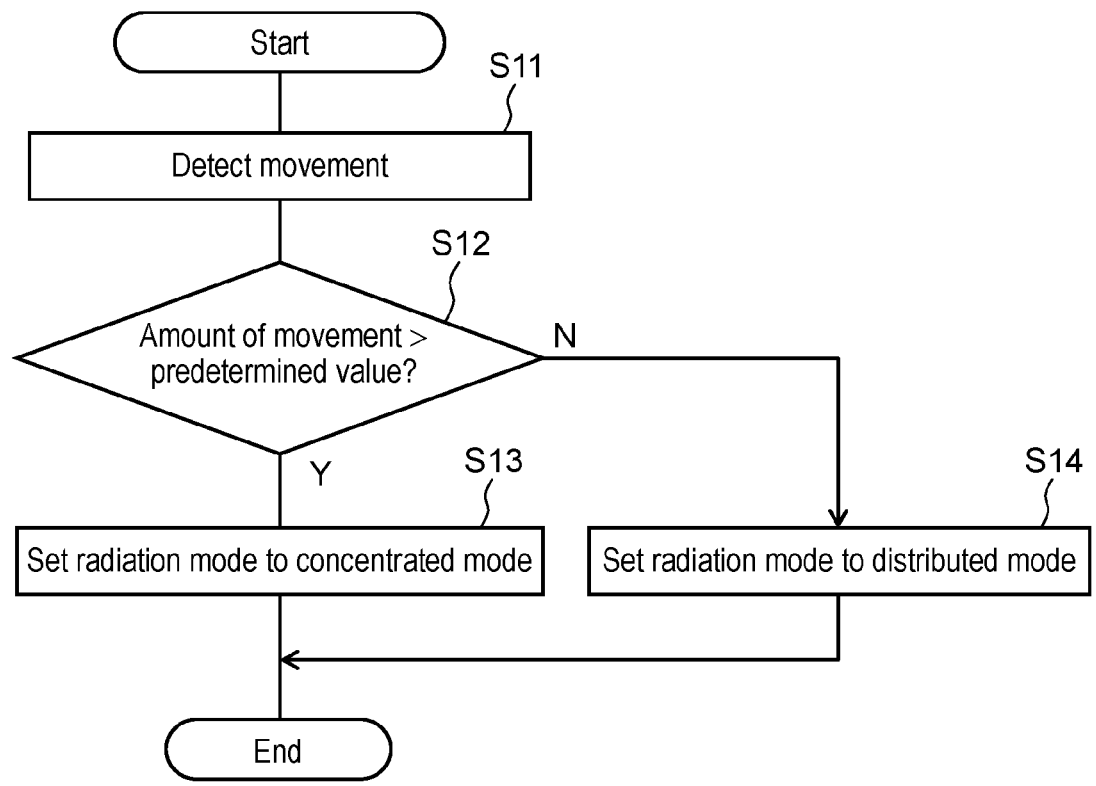
FIG. 7 is a flow chart showing switching control for a radiation mode of the projection device.

FIG. 7 is a flow chart showing switching control of the radiation mode. A switching process of the radiation mode by projection device 100 of the present exemplary embodiment will be described with reference to FIG. 7.

Timing controller 33 acquires, from movement detector 32, information indicating the amount of movement of projection target object 90 between preceding two frames (S11). Timing controller 33 determines, based on the received information indicating the amount of movement, whether the amount of movement of projection target object 90 is larger than a predetermined value or not (S12). The predetermined value here is a value of movement across the slit width of a measurement pattern during one frame period. If the amount of movement of projection target object 90 is larger than the predetermined value (YES in S12), timing controller 33 sets the radiation mode of the current frame to the concentrated mode (S13). On the other hand, if the amount of movement of projection target object 90 is at or smaller than the predetermined value (NO in S12), timing controller 33 sets the radiation mode of the current frame to the distributed mode (S14).

(1-3. Effects, etc.)

As described above, projection device 100 of the present exemplary embodiment includes projection unit 50 for radiating, on projection target object 90, in one frame period of a video, visible light images based on a video signal (for example, images in red light, green light, and blue light) and invisible light images for acquiring predetermined information (for example, images in infrared light) in a time-divided manner, and controller 30 for controlling an order of radiation periods for the visible light images and radiation periods for the invisible light images in one frame period. Controller 30 includes, as the radiation mode, a distributed mode (first mode) for radiating the invisible light images in a manner distributed over a plurality of periods in one frame period (FIG. 5A, distributed mode). By distributing the periods when invisible light is radiated, it is possible to reduce a flicker because periods when images visible to human eyes are not displayed are distributed.

Projection device 100 may further include imaging unit 10 for imaging an invisible light image projected on a projection target object and for generating a measurement image, and movement detector 32 for detecting the movement of projection target object 90 from the measurement image. Controller 30 includes, as the radiation mode, a concentrated mode (an example of a second mode) for radiating the invisible light images in a manner concentrated in one period within one frame period. Controller 30 switches the radiation mode to the distributed mode or the concentrated mode based on the movement of projection target object 90 detected by movement detector 32. Specifically, when the movement of projection target object 90 is at or smaller than a predetermined value, the radiation mode is set to the distributed mode, and when the movement of projection target object 90 is larger than the predetermined value, the radiation mode is set to the concentrated mode (steps S12 to S14 in FIG. 7). By switching the radiation mode in this manner, the flicker may be reduced when the movement of projection target object 90 is small, and also reduction in the accuracy of measurement based on the coded pattern projection method may be suppressed in the case where the movement of projection target object 90 is large and there is little possibility of occurrence of flicker.

Other Exemplary Embodiments

Heretofore, the first exemplary embodiment has been described as an example of the technique disclosed in the present application. However, the technique in the present disclosure is not limited to the above embodiment, and may also be applied to embodiments which have been subjected to modifications, substitutions, additions, or omissions as required. Moreover, it is also possible to combine the structural elements described in the first exemplary embodiment. In the following, other exemplary embodiments will be described as examples.

In the exemplary embodiment described above, the movement of projection target object 90 is detected based on an image that is generated by invisible light projected on projection target object 90 from projection unit 50 and is imaged by imaging unit 10, but this method is not restrictive. For example, a TOF (Time-of-Flight) distance image sensor may be provided, and an image in invisible light projected on projection target object 90 from projection unit 50 may be generated by using the TOF distance image sensor, and the movement of projection target object 90 may be detected from the generated image.

As shown in FIG. 5A, in the exemplary embodiment described above, in the distributed mode, a radiation period for invisible light (IR) is provided following each of red light (R), green light (G), and blue light (B), but the radiation period for invisible light may alternatively be provided after projection of one set of images in red light, green light, and blue light.

In the exemplary embodiment described above, one set of measurement patterns is projected in one frame period, but when the amount of movement of projection target object 90 is smaller than the predetermined value, one set of measurement patterns may be projected over a plurality of frame periods.

Furthermore, the phase of a measurement pattern image may be changed according to the amount of movement of projection target object 90. Also, one set of measurement pattern images may include a plurality of measurement pattern images (patterns 1 to 3) of different rates of spatial change of luminance. In the case where the amount of movement of projection target object 90 is smaller than the predetermined value, projection of a measurement pattern image having a spatially wide slit width (for example, pattern 1) among the set of measurement pattern images may be stopped, and visible light may be radiated in the radiation period for the relevant measurement pattern image.

Moreover, radiation may be performed by more finely dividing the radiation mode in such a way that invisible light images are distributed over a greater number of periods in one frame period, as the amount of movement of the projection target object becomes smaller.

Alternatively, the radiation periods for visible light may be increased, as the amount of movement of projection target object 90 becomes smaller. By increasing the length of the radiation period for visible light in one frame period, higher luminance may be obtained, and also the gradations of luminance may be increased.

Furthermore, in the case of performing measurement using a group of horizontal pattern images and a group of vertical pattern images, if the amount of movement of the projection target object is at or smaller than the predetermined value in one of the horizontal direction and the vertical direction, the length of period where invisible light images are output may be reduced as to the group of pattern images in the direction in which the amount of movement is at or smaller than the predetermined value. Then, visible light images may be output in the period corresponding to the reduced period. By increasing the length of the radiation period for visible light in one frame period, higher luminance may be obtained, and also the gradations of luminance may be increased.

Exemplary embodiments as examples of the technique in the present disclosure have been described above. The appended drawings and the detailed description are provided to this end.

Therefore, the structural elements shown in the appended drawings and described in the detailed description include not only structural elements that are essential for solving the problem but, to exemplify the technique, also other structural elements not essential for solving the problem. Hence, that these non-essential structural elements are shown in the appended drawings and described in the detailed description does not cause these structural elements to be immediately recognized as being essential.

Also, since the above-described exemplary embodiments are for exemplifying the technique in the present disclosure, the exemplary embodiments may be subjected to various kinds of modification, substitution, addition, omission, or the like within the scope of the claims and their equivalents.

The present disclosure may be applied to a projection device for projecting an image on a target object and for displaying the image.

What is claimed is:

1. A projection device comprising:
   a projection unit for radiating on a projection target object in a time-divided manner, in one frame period of a video, a visible light image that is based on a video signal and a plurality of measurement pattern images by an invisible light image, the plurality of measurement pattern images having spatially different slit widths respectively;
   an imaging unit for imaging the plurality of measurement pattern images projected on the projection target object, and generating a measurement image based on the plurality of measurement pattern images imaged by the imaging unit; and
   a controller configured to acquire predetermined information and to generate a video signal for projection,
   wherein the controller controls an order of a radiation period for the visible light image and a radiation period for the plurality of measurement pattern images by the invisible light image in the one frame period, and
   wherein the controller includes, as a radiation mode, a first mode for radiating the plurality of measurement pattern images by the invisible light image in a manner of distributing the invisible light image over a plurality of periods within the one frame period.

2. The projection device according to claim 1, further comprising:
   a movement detector for detecting a movement of the projection target object from the measurement image,
   wherein the controller includes, as the radiation mode, a second mode for radiating the plurality of measurement pattern images by the invisible light image in a manner of concentrating the plurality of measurement pattern images by the invisible light image in one period within the one frame period, and wherein the controller switches the radiation mode to the first mode or the second mode based on the movement, detected by the movement detector, of the projection target object.

3. The projection device according to claim 2, wherein the controller sets the radiation mode to the first mode when an amount of movement of the projection target object is equal to or smaller than a predetermined value, and sets the radiation mode to the second mode when the amount of movement of the projection target object is greater than the predetermined value.

4. The projection device according to claim 2, wherein the invisible light images includes a set of measurement pattern images.

5. The projection device according to claim 4,
wherein, in a case where an amount of movement of the projection target object is smaller than a predetermined value, the controller stops projection of a measurement pattern image, among the plurality of measurement pattern images, having a spatially wide slit width, and radiates the visible light image in a radiation period for the stopped measurement pattern image projection.

6. The projection device according to claim 1, wherein the controller radiates the plurality of measurement pattern images by the invisible light image in a manner of distributing the plurality of measurement pattern images by the invisible light image over a greater number of periods in the one frame period, as an amount of movement of the projection target object becomes smaller.

7. The projection device according to claim 1, wherein the visible light image is projected in red light, green light, and blue light, and the invisible light image is projected in infrared light.

8. The projection device according to claim 1,
wherein the visible light image includes red light (R), green light (G), and blue light (B), and
wherein a first measurement pattern image is projected after the red light (R) in the visible light image is projected, a second measurement pattern image is projected after the green (G) in the visible light image is projected, and a third measurement pattern image is projected in the first mode.

9. The projection device according to claim 8,
wherein the red light (R), the green light (G), and the blue light (B) are sequentially projected three times in the one frame period, in the first mode.

10. The projection device according to claim 1,
wherein the plurality of measurement pattern images are used in a coded pattern projection method.

11. A projection method comprising:
radiating on a projection target object in a time-divided manner, by a projection unit, in one frame period of a video, a visible light image that is based on a video signal and a plurality of measurement pattern images by an invisible light image, the plurality of measurement pattern images having spatially different slit widths respectively;
imaging, by an imaging unit, the plurality of measurement pattern images projected on the projection target object, and generating a measurement image based on the plurality of measurement pattern images; and
controlling, by a controller, to acquire predetermined information and to generate a video signal for projection,
wherein the controlling controls an order of a radiation period for the visible light image and a radiation period for the plurality of measurement pattern images by the invisible light image in the one frame period, and
wherein the controlling includes, as a radiation mode, a first mode for radiating the plurality of measurement pattern images by the invisible light image in a manner of distributing the plurality of measurement pattern images by the invisible light image over a plurality of periods within the one frame period.

12. The projection method according to claim 11, further comprising:
detecting a movement, by a movement detector, of the projection target object from the measurement image,
wherein the controlling includes, as the radiation mode, a second mode for radiating the plurality of measurement pattern images by the invisible light image in a manner of concentrating the plurality of measurement pattern images by the invisible light image in one period within the one frame period, and
wherein, in the controlling, the radiation mode is switched to the first mode or the second mode based on the movement, detected in the step of detecting a movement, of the projection target object.

13. The projection method according to claim 11,
wherein, in the controlling, in a case where an amount of movement of the projection target object is smaller than a predetermined value, the controller stops projection of a measurement pattern image, among the plurality of measurement pattern images, having a spatially wide slit width, and radiates the visible light image in a radiation period for the stopped measurement pattern image projection.

14. A projection device comprising:
a projection unit for radiating on a projection target object in a time-divided manner, in one frame period of a video, a visible light image that is based on a video signal and an invisible light image for acquiring predetermined information, the invisible light image including a set of measurement pattern images that have a plurality of measurement pattern images having spatially different slit widths respectively;
a controller for controlling an order of a radiation period for the visible light image and a radiation period for the invisible light image in the one frame period,
the controller including:
a first mode, as a radiation mode, for radiating the invisible light image in a manner of distributing the invisible light image over a plurality of periods within the one frame period; and
a second mode, as the radiation mode, for radiating the invisible light image in a manner of concentrating the invisible light image in one period within the one frame period,
an imaging unit for imaging the invisible light image projected on the projection target object, and generating a measurement image; and
a movement detector for detecting a movement of the projection target object from the measurement image,
wherein the controller switches the radiation mode to the first mode or the second mode based on the movement, detected by the movement detector, of the projection target object, and
wherein, in a case where an amount of movement of the projection target object is smaller than a predetermined value, the controller stops projection of a measurement pattern image, among the set of measurement pattern images, having a spatially wide slit width, and radiates the visible light image in a radiation period for the stopped measurement pattern image projection.

* * * * *